United States Patent
Fukuma et al.

(10) Patent No.: US 10,209,426 B2
(45) Date of Patent: Feb. 19, 2019

(54) BACKLIGHT UNIT AND LIQUID CRYSTAL DISPLAY DEVICE

(71) Applicant: Japan Display Inc., Minato-ku (JP)

(72) Inventors: Toshihiko Fukuma, Tokyo (JP); Shinichi Komura, Tokyo (JP); Youichi Asakawa, Tokyo (JP); Ken Onoda, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/459,275

(22) Filed: Mar. 15, 2017

(65) Prior Publication Data
US 2017/0269278 A1 Sep. 21, 2017

(30) Foreign Application Priority Data
Mar. 15, 2016 (JP) .................. 2016-050987

(51) Int. Cl.
*F21V 8/00* (2006.01)

(52) U.S. Cl.
CPC .......... *G02B 6/003* (2013.01); *G02B 6/0065* (2013.01)

(58) Field of Classification Search
CPC .. G02B 6/0023; G02B 6/0025; G02B 6/0028; G02B 6/003; G02B 6/0065
See application file for complete search history.

(56) References Cited

U.S. PATENT DOCUMENTS

| | | | |
|---|---|---|---|
| 8,154,685 B2* | 4/2012 | Nakayama | G02B 13/16 349/61 |
| 2007/0064417 A1* | 3/2007 | Hatanaka | G02B 6/0028 362/231 |
| 2008/0055515 A1* | 3/2008 | Ha | G02B 6/0056 349/61 |
| 2008/0192173 A1* | 8/2008 | Itoh | G02B 6/0016 349/61 |
| 2009/0168453 A1 | 7/2009 | Koike et al. | |
| 2010/0045894 A1* | 2/2010 | Itoh | G02B 6/0025 349/61 |
| 2010/0220261 A1* | 9/2010 | Mizushima | G02B 6/0035 349/64 |
| 2012/0008067 A1* | 1/2012 | Mun | G02B 6/003 349/65 |

FOREIGN PATENT DOCUMENTS

| | | |
|---|---|---|
| JP | 2009-231018 | 10/2009 |
| JP | 5263771 | 8/2013 |

* cited by examiner

*Primary Examiner* — Alexander K Garlen
(74) *Attorney, Agent, or Firm* — Oblon, McClelland, Maier & Neustadt, L.L.P.

(57) ABSTRACT

According to one embodiment, a backlight unit includes a light source, a first lens, a second lens, and a light guide unit. The light source emits light which is diffused as the light travels in a first-A direction, the light being diffused in a second direction intersecting the first-A direction, and a third direction intersecting the first-A direction and the second direction. The first lens and the second lens are arranged in an optical path of the light. The first and second lenses control the light such that the first lens controls a beam width of the light in the second direction, and the second lens controls a beam width of the light in the third direction, thereby converting the light into parallel light.

9 Claims, 13 Drawing Sheets

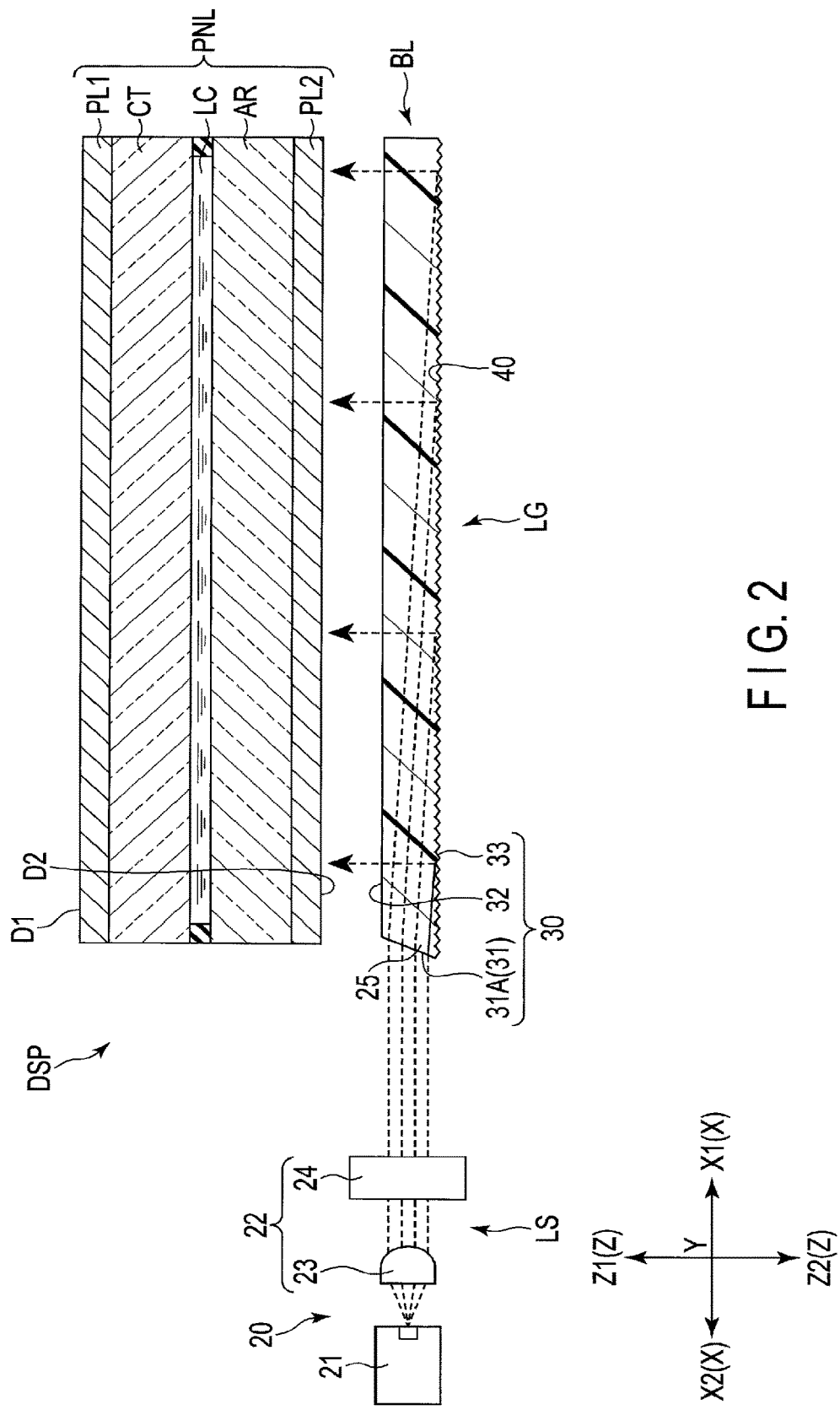
F I G. 2

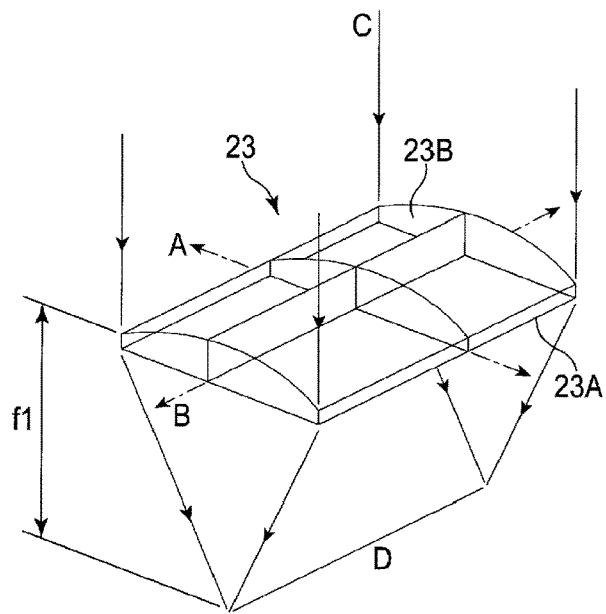
F I G. 6
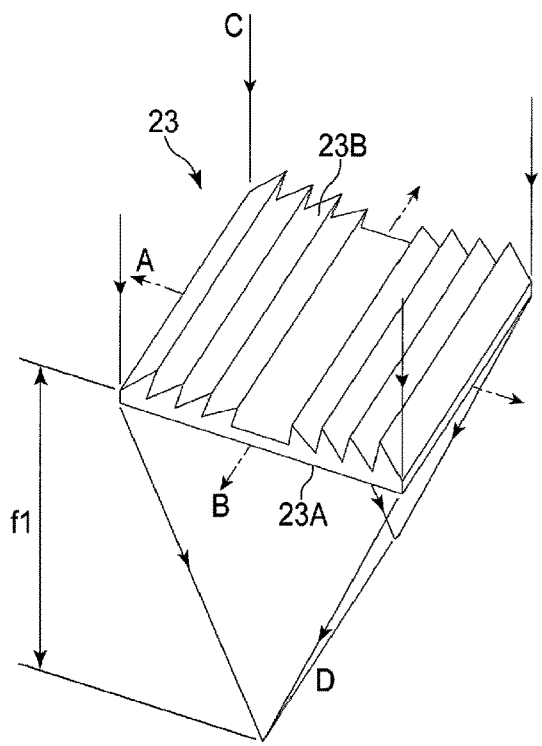
F I G. 7

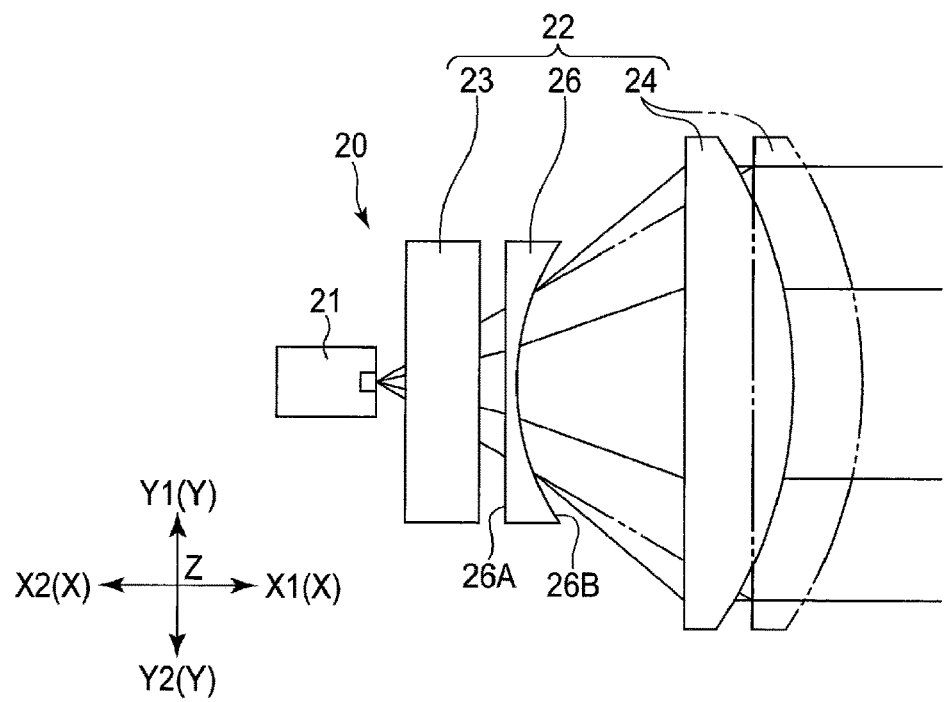
F I G. 10
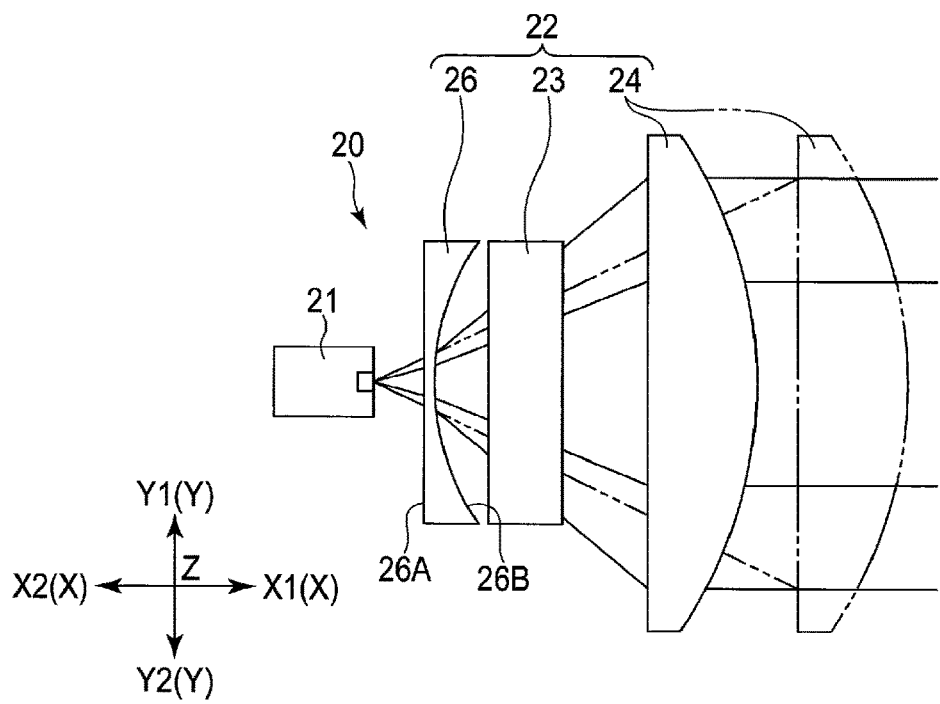
F I G. 11

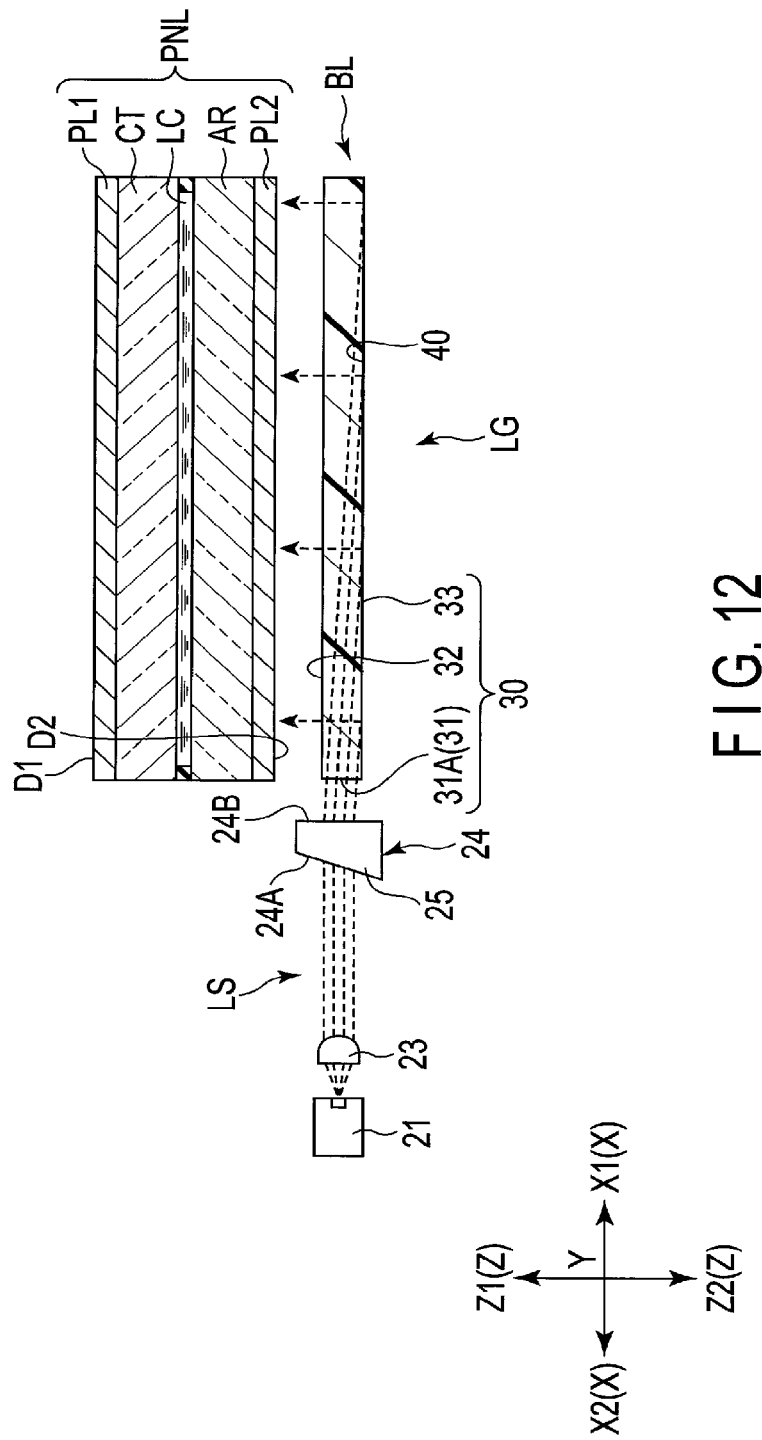
F I G. 12

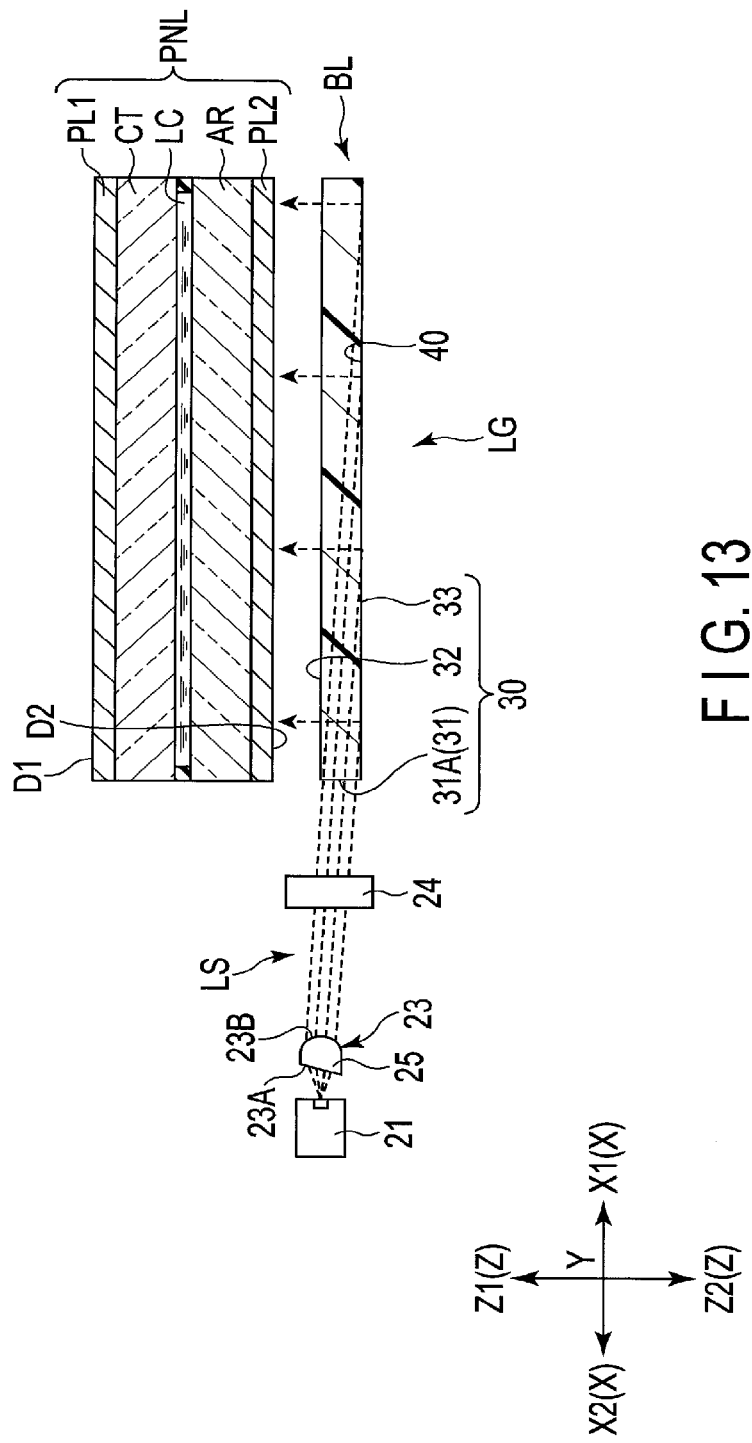
F I G. 13

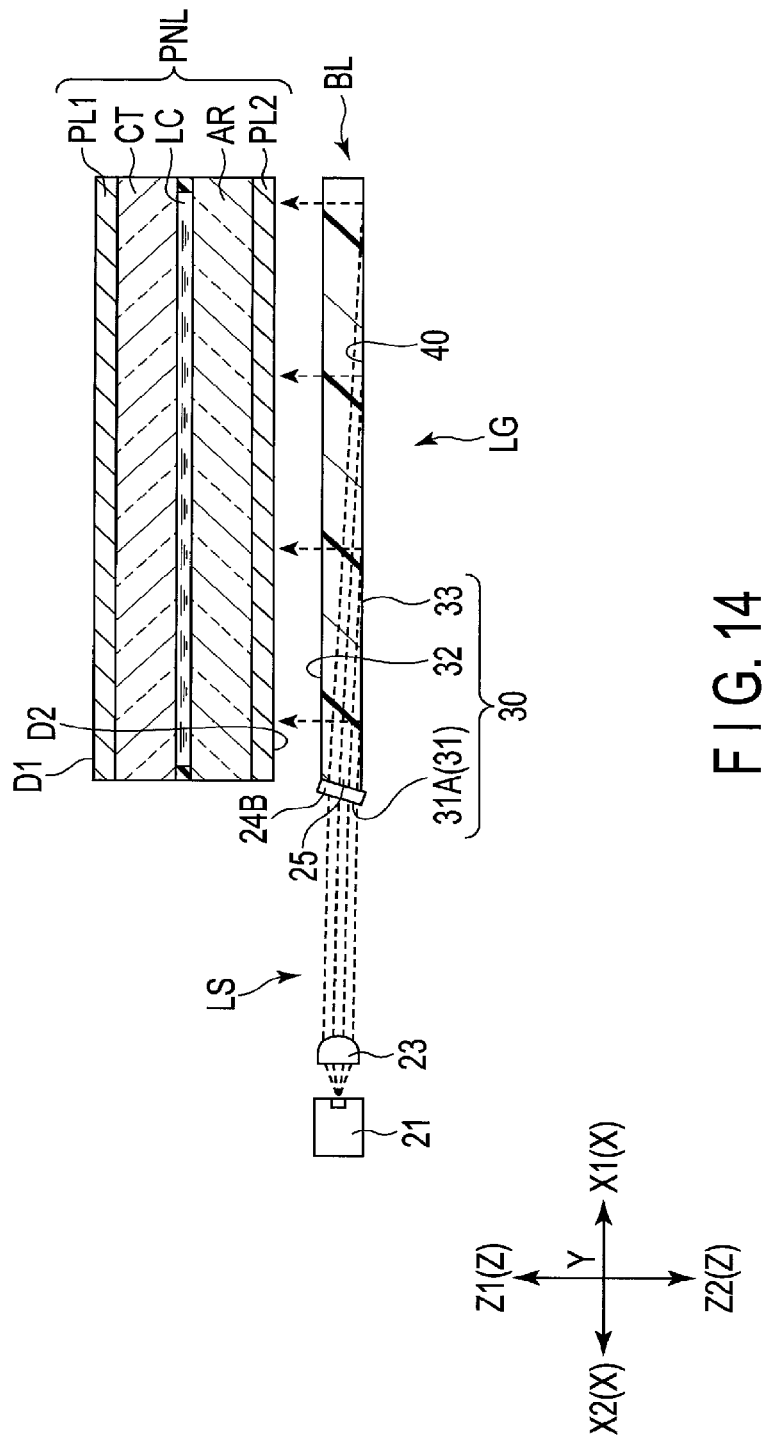
F I G. 14

BACKLIGHT UNIT AND LIQUID CRYSTAL DISPLAY DEVICE

CROSS-REFERENCE TO RELATED APPLICATIONS

This application is based upon and claims the benefit of priority from Japanese Patent Application No. 2016-050987, filed Mar. 15, 2016, the entire contents of which are incorporated herein by reference.

FIELD

Embodiments described herein relate generally to a backlight unit and a liquid crystal display device.

BACKGROUND

A display device such as a liquid crystal display device comprises liquid crystal cells which selectively transmit light, and a backlight unit which irradiates planar light on a rear surface of the liquid crystal cells.

As the backlight unit, a surface light source device comprising a light-emitting device which emits point light, first and second aspheric lenses which collimate light from the light-emitting apparatus as parallel light, a cylindrical Fresnel lens which converges the parallel light transmitted through the first and second aspheric lenses to a light guide plate, and the light guide plate which emits planar light has been proposed (for example, JP 2009-231018 A).

Generally, light emitted from a light-emitting device such as a laser diode is point light which is diffused elliptically, and has a specific aspect ratio. Meanwhile, a light guide plate is formed thin and flat in order to make a surface light source device thin.

Accordingly, there is a great difference between the aspect ratio of an incident surface of the light guide plate and the aspect ratio of a cross section of an optical path. When the light is irradiated onto the incident surface such that a horizontal beam width of the light matches a horizontal width of the incident surface, a vertical width of the optical path exceeds a vertical width of the incident surface. Since light leaking from the incident surface is not guided to an emission surface and the light is thereby lost, power is wasted. Conversely, when the light is irradiated onto the incident surface such that a vertical beam width of the light matches a vertical width of the incident surface, a horizontal width of the optical path becomes less than a horizontal width of the incident surface. Because of this, the light does not reach every corner of the light guide plate, and plane emission cannot be performed evenly.

In order to approximate the aspect ratios of the incident surface and the light, in JP 2009-231018 A, a cylindrical Fresnel lens which converges parallel light greater than the incident surface in the vertical width is added. However, even if the vertical beam width of light extending greatly is to be adjusted by a lens later as described in JP 2009-231018 A, a loss of light occurs inside the lens. Also, in JP 2009-231018 A, light is reflected multiple times within the light guide plate to guide the light. Accordingly, when polarized light is used as a light source, there is a concern of reduction of a degree of polarization.

BRIEF DESCRIPTION OF THE DRAWINGS

FIG. 2 is a cross-sectional view showing a liquid crystal display device comprising a backlight unit according to a first embodiment.

FIG. 6 is a perspective view showing an example of first and second lenses illustrated in FIG. 3.

FIG. 7 is a perspective view showing another example of the first and second lenses illustrated in FIG. 3.

FIG. 10 is a plan view showing the structure of a backlight unit according to a second embodiment.

FIG. 11 is a plan view showing the structure of a modification of the backlight unit according to the second embodiment.

FIG. 12 is a cross-sectional view showing the structure of a backlight unit according to a third embodiment.

FIG. 13 is a cross-sectional view showing the structure of a modification of the backlight unit according to the third embodiment.

FIG. 14 is a cross-sectional view showing the structure of a backlight unit according to a fourth embodiment.

DETAILED DESCRIPTION

Figure 1:
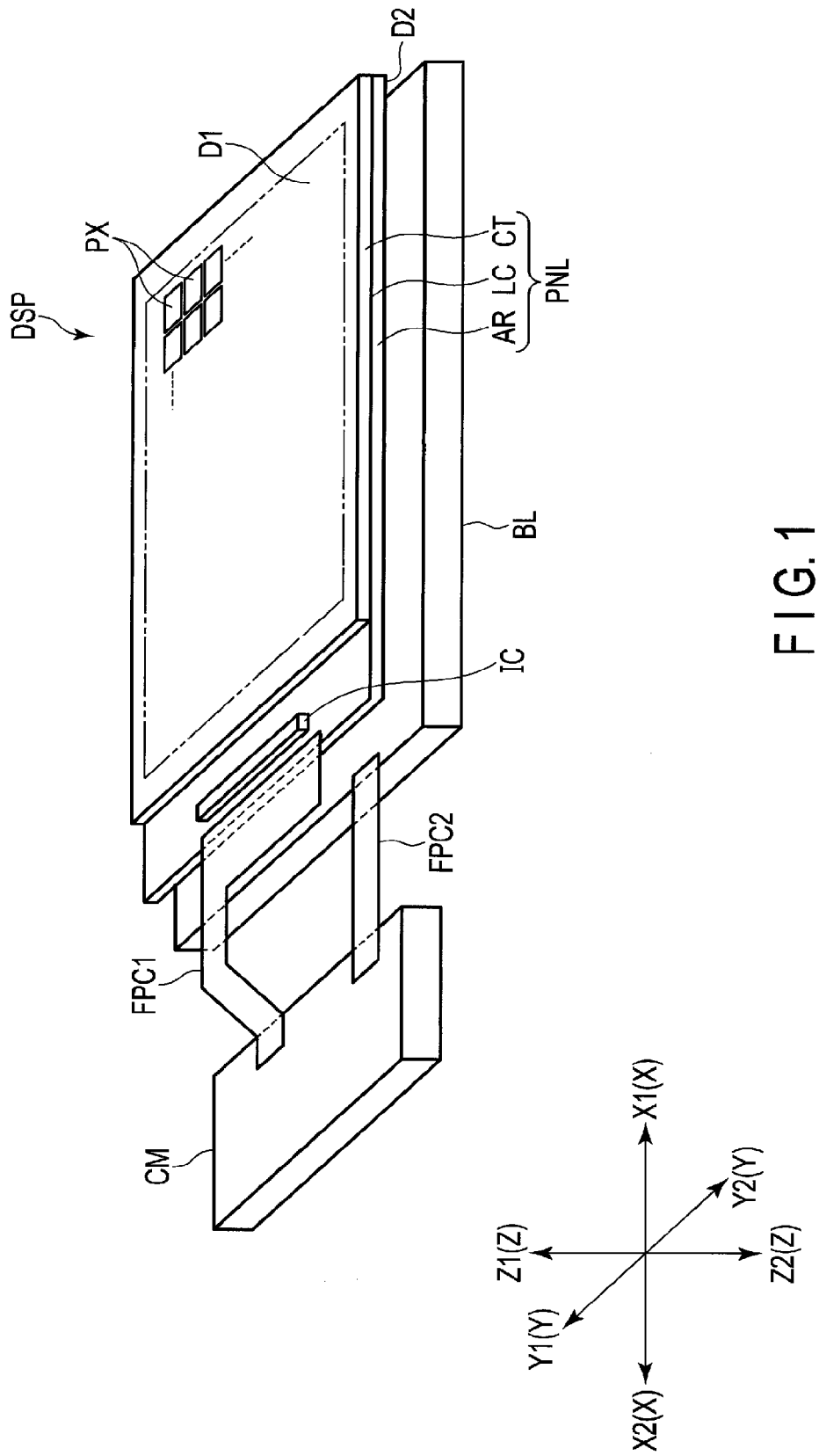
FIG. 1 is a perspective view showing a liquid crystal display device as an example of a display device.

The embodiments aim to provide a backlight unit and a display device which can reduce power consumption and perform plane emission evenly.

In general, according to one embodiment, a backlight unit includes a light source, a first lens, a second lens, and a light guide unit. The light source emits light which is diffused as the light travels in a first-A direction, the light being diffused in a second direction intersecting the first-A direction, and a third direction intersecting the first-A direction and the second direction. The first lens and the second lens are arranged in an optical path of the light, and convert the light into parallel light. The first and second lenses control the light such that the first lens controls a beam width of the light in the second direction, and the second lens controls a beam width of the light in the third direction, thereby converting the light into parallel light. The light transmitted through the first and second lenses is incident on the light guide unit. The light guide unit includes an incident surface on which the light is incident, an emission surface from which the light is emitted, and a light directing portion which directs the light incident on the incident surface toward the emission surface.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

FIG. 1 is a perspective view showing a display device according to the present embodiment.

In each of the embodiments, a transmissive liquid crystal display device will be described as an example of the display device. However, the embodiments do not preclude the application of technical ideas disclosed in the present specification to other types of display devices. As the other types of display devices, for example, a display device including a mechanical display cell in which a micro-electromechanical systems (MEMS) shutter functions as an optical element, and a display device including an electronic paper display cell with electrophoretic elements, etc., are assumed.

First, referring to FIGS. 1 and 2, a structure common to the respective embodiments will be described. FIG. 1 is a perspective view showing a schematic structure of a liquid crystal display device DSP of each of the embodiments. The liquid crystal display device DSP can be used in various devices such as a smartphone, a tablet device, a cellular phone, a personal computer, a television receiver, an in-vehicle device, and a game console, and a wearable device.

The liquid crystal display device DSP comprises a display panel PNL, a backlight unit BL which irradiates parallel light to the display panel PNL, a control module CM which controls the operation of the display panel PNL and the backlight unit BL, a driving IC chip IC which drives the display panel PNL, flexible printed circuits FPC1 and FPC2 which transmit control signals of the control module CM to the display panel PNL and the backlight unit BL, and the like.

The display panel (liquid crystal cell) PNL comprises an array substrate AR, a counter-substrate CT opposed to the array substrate AR, and a liquid crystal layer LC held between the array substrate AR and the counter-substrate CT. The liquid crystal layer LC is an example of an optical element which selectively transmits light. The display panel PNL includes a display surface D1, and a rear surface D2 on the opposite side of the display surface D1, and displays an image on a display area, which is arranged on the display surface D1, by selectively transmitting the parallel light irradiated onto the rear surface D2. The display panel PNL includes a plurality of pixels PX arranged in a matrix in the display area. Each of the pixels PX is constituted of a plurality of sub-pixels provided with, for example, a color filter which adds color to light, or a light-emitting layer.

The backlight unit BL is arranged to be opposed to the array substrate AR of the display panel PNL, and irradiates parallel light to the rear surface D2 of the display panel PNL. Each embodiment of the backlight unit BL will be described in detail later.

FIG. 2 is a cross-sectional view of the liquid crystal display device DSP. The array substrate AR and the counter-substrate CT are formed by processing a glass substrate having light transmissivity. Note that a resin material having light transmissivity such as acrylic resin may be processed. In the example shown in FIG. 2, polarizers PL1 and PL2 are arranged on both surfaces of the display panel PNL. The polarizer PL1 is arranged on the display surface D1, and is adhered to, for example, the counter-substrate CT. The polarizer PL2 is arranged on the rear surface D2, and is adhered to, for example, the array substrate AR.

The backlight unit BL comprises a light source unit LS, and a light guide unit LG. The light source unit LS is arranged along, for example, a short side of the array substrate AR. Note that the light source unit LS may be arranged along the other side of the array substrate AR. The light guide unit LG guides parallel light emitted from the light source unit LS toward the display panel PNL.

[First Embodiment]

Figure 3:
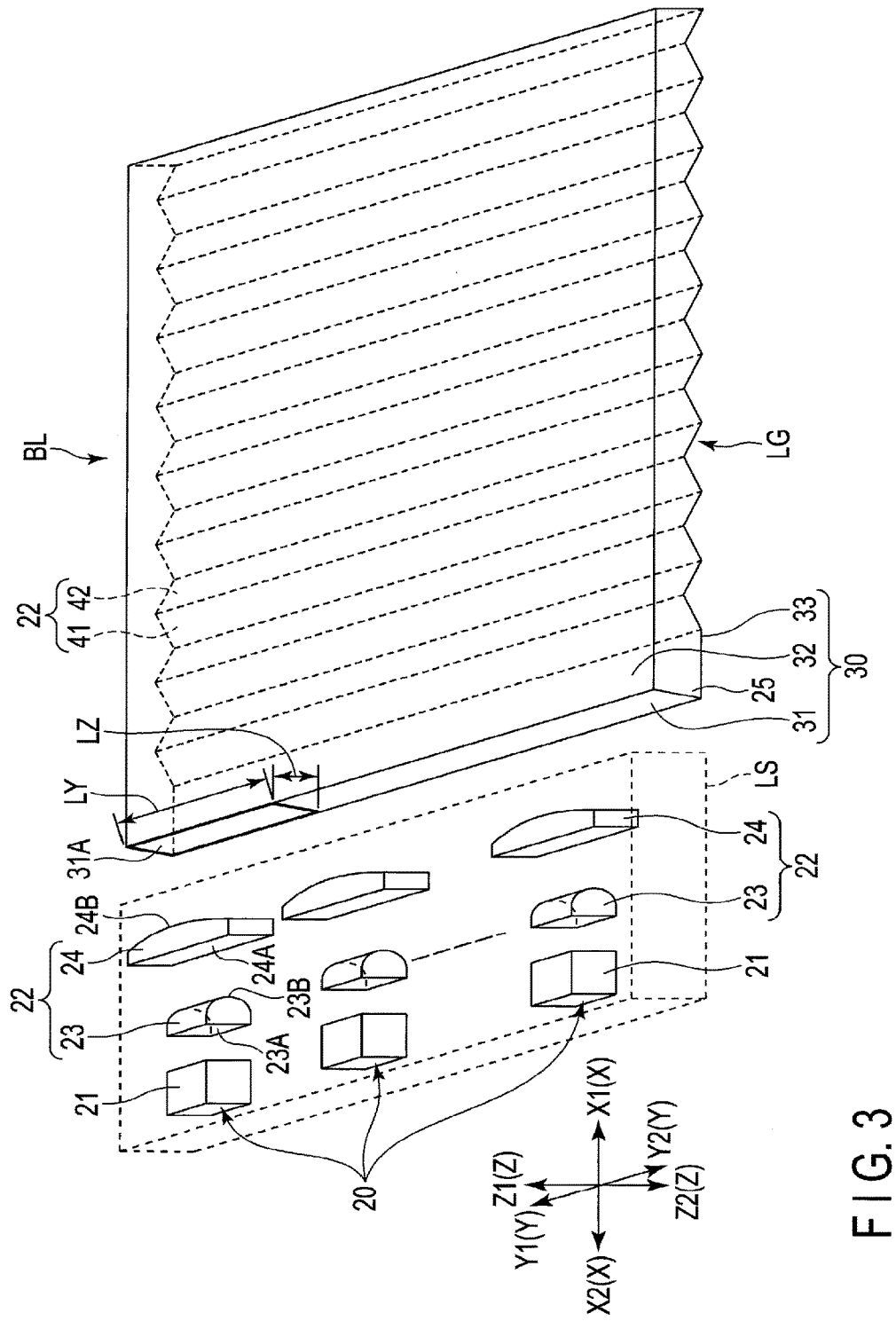
FIG. 3 is a perspective view showing the structure of the backlight unit of the first embodiment.

A first embodiment will be described referring to FIGS. 2 to 9. FIG. 3 is a perspective view showing the structure of the backlight unit BL of the first embodiment shown in FIG. 2. As shown in FIG. 3, the light source unit LS comprises a plurality of light source units 20 arranged along one side of the light guide unit LG. Note that the light source unit LS may comprise a single light source unit 20. Each of the light source units 20 is mounted on a circuit board electrically connected to the aforementioned flexible printed circuit FPC2, for example.

Each of the light source units 20 includes a light source 21 which emits light, and a collimator 22 which converts the light emitted from the light source 21 into parallel light. The parallel light is also called collimated light, and is light which travels substantially linearly through space with high directivity. In the present specification, the parallel light is not limited to light whose rays are parallel to each other in a strict sense, and includes substantially parallel light which is slightly diffused.

The light source 21 is opposed to the light guide unit LG. The collimator 22 is arranged between the light source 21 and the light guide unit LG. The collimator 22 according to the present embodiment includes a first lens 23 and a second lens 24 arranged in an optical path of light emitted from the light source 21. Further, by connecting ends of the adjacent first lenses 23 to each other, a plurality of first lenses can be formed integrally. Similarly, a plurality of second lenses 24 can be formed integrally. The light source 21 according to the present embodiment is a point light source which irradiates divergent light, and for the light source 21, a laser device such as a semiconductor laser which emits a laser beam, or an LED element using a light-emitting diode, for example, can be used.

Figure 4:
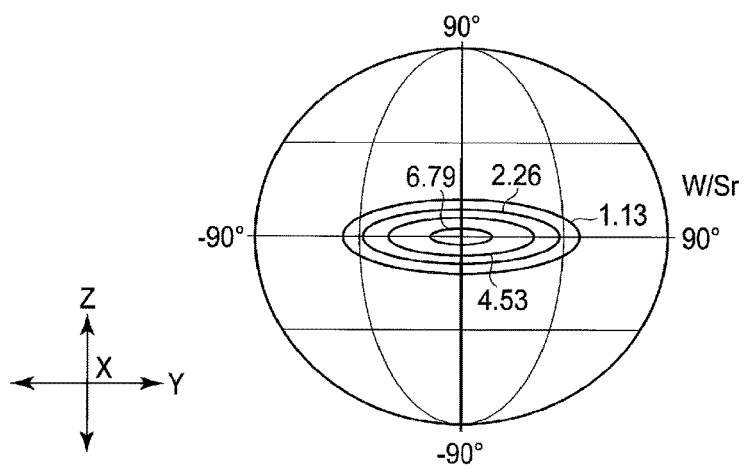
FIG. 4 is an illustration showing an angle distribution of radiant intensity of light emitted from a light source illustrated in FIG. 3.

FIG. 4 is an illustration showing an angle distribution of radiant intensity of light obtained immediately after it has been emitted from the light source 21. The center in the illustration of FIG. 4 represents the light intensity at angle of 0° with respect to the optical axis, and the circumference represents the light intensity at an angle of 90° with respect to the optical axis. As shown in FIG. 4, the light emitted from the light source 21 is elliptically diffused about the optical axis. It is assumed that a direction along the optical axis is defined as a first direction X, a direction along the minor axis of an ellipse is defined as a second direction Z, and a direction along the major axis of the ellipse is defined as a third direction Y. Further, the first direction X can be referred to as an optical axis direction of light, the second direction Z can be referred to as a minor axis direction of the light, and the third direction Y can be referred to as a major axis direction of the light.

The first direction X, the second direction Z, and the third direction Y intersect perpendicular to each other. Note that the first to third directions X, Z, and Y may intersect each other at a different angle. In the present embodiment, as shown in FIG. 2, each of the light sources 21 is arranged such that the second direction Z agrees with a thickness direction of the backlight unit BL, and the third direction Y agrees with a short-side direction of the backlight unit BL.

The first direction X includes a first-A direction X1, and a first-B direction X2 opposite to the first-A direction X1. The second direction Z includes a second-A direction Z1, and a second-B direction Z2 opposite to the second-A direction Z1. The third direction Y includes a third-A direction Y1, and a third-B direction Y2 opposite to the third-A direction Y1. With respect to the first direction X, a traveling direction of light emitted from the light source 21 is assumed as the first-A direction X1. With respect to the second direction Z, a direction of emission from the backlight unit BL is assumed as the third-A direction Z1.

Figure 5:
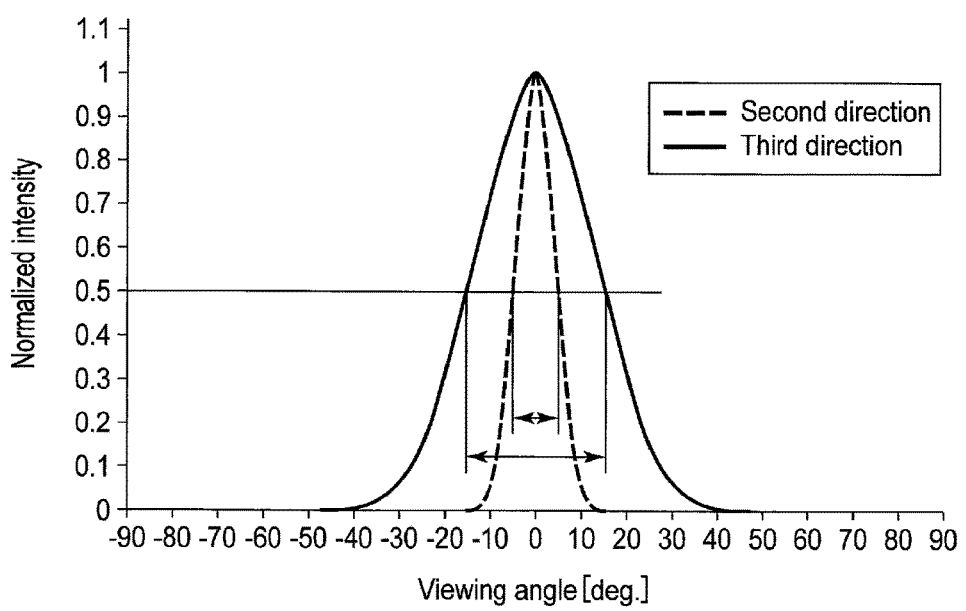
FIG. 5 is an illustration showing a profile of a half width (FWHM; full width at half maximum) of angular intensity of light emitted from the light source illustrated in FIG. 3.

FIG. 5 is an illustration showing a profile of an angular intensity half width of emission light from the light source 21. As shown in FIG. 5, the light emitted from the light source 21 is diffused with the half width (full width at half maximum) of 10 degrees in the second direction Z, and 30 degrees in the third direction Y.

As the first lens 23 and the second lens 24 of the collimator 22 are combined, the light emitted from the light source 21 which is diffused in the second direction Z and the third direction Y is converted into parallel light. More specifically, as the first lens 23 controls the beam width of light in the second direction Z to be constant, and the second lens 24 controls the beam width of light in the third direction Y to be constant, the light emitted from the light source 21 is converted into parallel light. The beam width of light mentioned above refers to, for example, the light of the half width. Note that the beam width of light is not necessarily expressed by the half width corresponding to half the peak value, and may be a beam width defined with reference to the other relative intensity.

Hereinafter, referring to FIGS. 6 and 7, the functions of the first and second lenses 23 and 24 will be described. Note that the second lens 24 has a shape similar to the first lens 23, although its size and the ratio of a short side to a long side are different. Therefore, the first lens 23 will be described in detail as a representative, and a duplicated explanation is omitted for the second lens 24. FIG. 6 is a perspective view showing an example of the first lens 23. FIG. 7 is a perspective view showing another example of the first lens 23.

In FIGS. 6 and 7, in order to facilitate the understanding of the function of the first lens 23, an example in which the parallel light is irradiated onto the first lens 23, and the light is converged to a focal point will be adopted for descriptive purposes. However, in the present embodiment, the first and second lenses 23 and 24 are arranged such that diffused light from the light source 21, which is the point light source, is transmitted through the first lens 23 and the second lens 24 in order, and is controlled to be parallel light.

The first lens 23 has refractive power in a fourth direction A, and does not have refractive power in a fifth direction B which is orthogonal to the fourth direction A. Accordingly, the first lens 23 has the function of concentrating the parallel light irradiated in a sixth direction C orthogonal to the fourth direction A and the fifth direction B to a straight line D. In the descriptions given below, a direction along the straight line D may be called an axial direction of the first lens 23, a direction orthogonal to the axial direction may be called a refraction direction of the first lens 23, the straight line D may be called a focal point line of the first lens 23, and a distance between the first lens 23 and the straight line D may be called the focal distance of the first lens 23. The axial direction is the same as the fifth direction B. The refraction direction conforms to the fourth direction A. As the first lens 23 and the second lens 24, a plane-convex cylindrical lens, for example, can be used.

In the example illustrated in FIG. 6, the first lens 23 includes a flat surface 23A and a convex surface (a cylindrical surface) 23B. A cross-section obtained by cutting the first lens 23 in the direction parallel to the axial direction becomes rectangular as the intersection at the convex surface 23B is linear. A cross-section obtained by cutting the first lens 23 in the direction intersecting the axial direction does not become rectangular as the intersection at the convex surface 23B is curved.

As shown in FIG. 3, the first lens 23 and the second lens 24 are arranged such that their refraction directions (fourth directions) are orthogonal to each other. In the example illustrated in FIG. 3, a cylindrical lens is employed as the first and second lenses 23 and 24, the flat surface 23A of the first lens 23 is opposed to the light source 21, and the convex surface 23B is opposed to the second lens 24. A flat surface 24A of the second lens 24 is opposed to the first lens 23, and a convex surface 24B is opposed to an incident surface 31A. Note that when a cylindrical lens is employed as the first and second lenses 23 and 24, the flat side and the convex side of the lens is not limited to the illustrated example. That is, the convex surface 23B of the first lens 23 may be opposed to the light source 21, and the convex surface 24B of the second lens 24 may be opposed to the first lens 23.

The first lens 23 and the second lens 24 are not limited to the example shown in FIG. 6, and a Fresnel lens having a convex surface 23B obtained by dividing a convex surface of the cylindrical lens, as shown in FIG. 7, may be employed. Also in this case, each of the first and second lenses 23 and 24 has a contour that the cross-section thereof becomes rectangular when cut in a direction parallel to the axial direction, and does not become rectangular when cut in a direction intersecting the axial direction. Alternatively, a graded index (GRIN) lens, etc., which converges the parallel light linearly by using not the curvature of the lens contour, but a refractive-index distribution within the lens, can be used.

When parallel light is passed through the first and second lenses 23 and 24 shown in FIG. 6 or 7 in the sixth direction C, the light comes into a focus on the straight line D. However, on the contrary, when emission light from the light source 21 located on the straight line D is passed through the first and second lenses 23 and 24, the beam width of the light in the fourth direction A is controlled to be constant. The collimator 22 converts the light emitted from the light source 21 into parallel light by the first and second lenses 23 and 24. The parallel light obtained as a result of having been passed through the collimator 22 enters the light guide unit LG.

As shown in FIG. 2, the light guide unit LG according to the present embodiment is constituted by a light guide plate 30, and a light directing portion 40 provided on the light guide plate 30. Although explanation will be provided later in a sixth embodiment, note that the structure of the light guide unit LG is not limited to this, and the light guide plate 30 can be omitted. A part of the array substrate AR or the like can be used to constitute a part of the light guide unit LG.

The light guide plate 30 is a plate-like member formed of, for example, a resin material having light transmissivity. The light guide plate 30 is arranged on the rear surface D2 of the display panel PNL, and is opposed to the array substrate AR. The light guide plate 30 includes a side surface 31, a first main surface 32, and a second main surface 33. The side surface 31 is opposed to the light source unit LS, the first main surface 32 is opposed to the display panel PNL, and the second main surface 33 is located on the opposite side of the first main surface 32. The side surface 31 includes a plurality of incident surfaces 31A. Note that the side surface 31 may be structured to be formed of a single incident surface 31A.

As shown in FIG. 3, each of the incident surfaces 31A is opposed to the corresponding light source unit 20. Parallel light emitted from the corresponding light source unit 20 is made incident on each of the incident surfaces 31A. The incident parallel light is totally reflected (i.e., Fresnel reflection occurs) by the light directing portion 40 such as a prism formed on the second main surface 33, and is emitted from the first main surface 32. The first main surface 32 is an example of an emission surface. Note that the reflection at the light directing portion 40 may be specular reflection.

The incident surface 31A according to the present embodiment is formed such that a length LY in the third direction Y (referred to as a "horizontal width") is greater than a length LZ in the second direction Z (referred to as a "vertical width"). In the example illustrated in FIG. 3, the length LZ is formed as 3 mm, and the length LY is formed as 60 mm. The aspect ratio (the ratio between the long side and the short side) of the incident surface 31A is not the same as the aspect ratio (the ratio between the major axis and the minor axis) of light emitted from the light source 21.

As shown in FIG. 2, the incident surface 31A is inclined with respect to the first direction X and the second direction Z in an X-Z cross-section. The incident surface 31A makes an obtuse angle with the first main surface 32, for example, and makes an acute angle with the second main surface 33. When the parallel light emitted from the light source unit LS enters the light guide plate 30 through the incident surface 31A, the light is refracted toward the light directing portion 40 while being kept parallel. That is, the incident surface 31A according to the present embodiment has the function as a third lens 25 which refracts the light from the light source 21 toward the light directing portion 40.

As shown in FIG. 3, the light directing portion 40 includes a plurality of inclined surfaces 41 and 42 which are inclined with respect to the X-Y plane. Each of the inclined surfaces 41 and 42 extends parallel to the third direction Y, and is a plane which intersects the first direction X and the second direction Z. The inclined surface 41 faces the light source unit LS, totally reflects the parallel light traveling toward the second main surface 33 from the incident surface 31A, and directs the optical path toward the display panel PNL. The inclined surface 42 faces the side opposite to the light source unit LS. With respect to the light guide unit LG according to the present embodiment, the light directing portion 40 directs the parallel light toward the display panel PNL with one-time total reflection.

Figure 8:
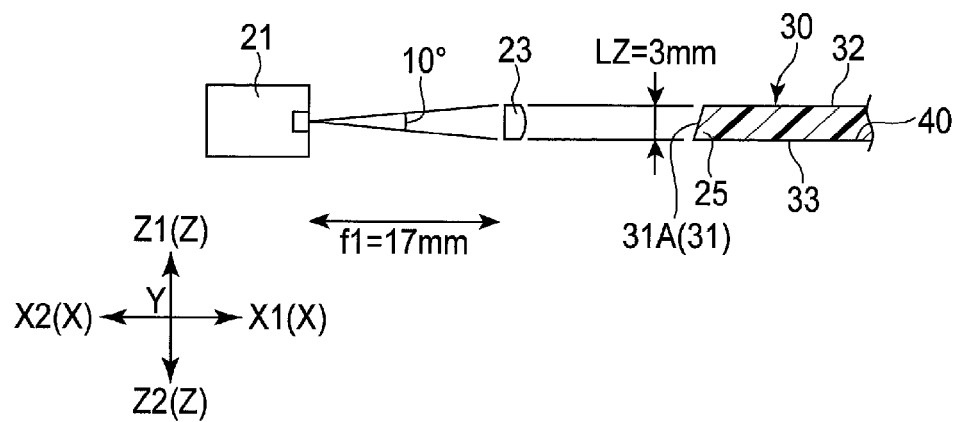
FIG. 8 is a cross-sectional view showing an example of the relationship between the first lens, the light source, and an incident surface shown in FIG. 3.

Next, a mutual relationship between the angle of light emitted from the light source 21, the lengths LZ and LY of the incident surface 31A, and the focal distances f1 and f2 of the first and second lenses 23 and 24, which have been described, will be explained by giving a specific example. FIG. 8 is a cross-sectional view showing an example of the relationship between the first lens 23, the light source 21, and the incident surface 31A shown in FIG. 3. As described above, the incident surface 31A is formed such that the length LZ in the second direction Z is set to 3 mm, for example. The light emitted from the light source 21 is diffused at an angle of 10 degrees, for example, in the second direction Z. In this case, at a point separated from the light source 21 by 17 mm, the beam width (half width) of light in the second direction Z becomes substantially the same as the length LZ of the incident surface 31A in the second direction Z. In each of the embodiments disclosed in the present specification, the collimator 22 comprises the first lens 23 whereby the distance (17 mm in the example shown in FIG. 8) at which the beam width of light in the second direction Z becomes substantially the same as the length LZ matches the focal distance f1. The light source 21 is arranged at the focal point of the first lens 23. The light emitted toward the incidence surface 31A through the first lens 23 is controlled to be of the same width as the width of the incidence surface 31A in the second direction Z.

Figure 9:
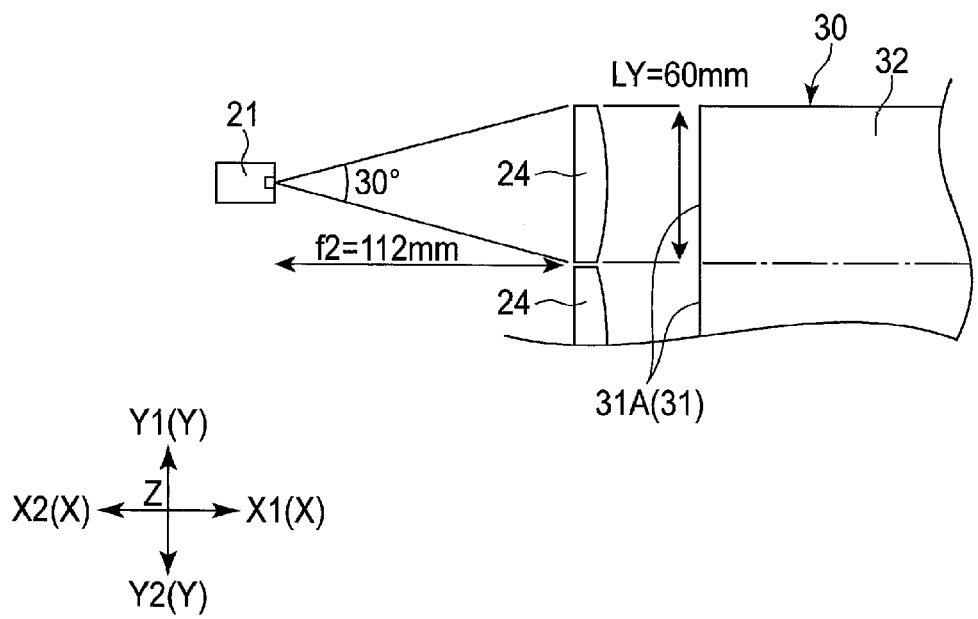
FIG. 9 is a plan view showing an example of the relationship between the second lens, the light source, and the incident surface shown in FIG. 3.

FIG. 9 is a plan view showing an example of the relationship between the second lens 24, the light source 21, and the incident surface 31A, shown in FIG. 3. As described above, the incident surface 31A is formed such that the length LY in the third direction Y is set to 60 mm, for example. The light emitted from the light source 21 is diffused at an angle of 30 degrees, for example, in the third direction Y. In this case, at a point separated from the light source 21 by 112 mm, the beam width (half width) of light in the third direction Y becomes substantially the same as the length LY of the incident surface 31A in the third direction Y. The collimator 22 according to the present embodiment comprises the second lens 24 whereby the distance (112 mm in the example shown in FIG. 9) at which the beam width of light in the third direction Y becomes substantially the same as the length LY matches the focal distance f2. The light source 21 is arranged at the focal point of the second lens 24. The light emitted toward the incidence surface 31A through the second lens 24 is controlled to be of the same width as the width of the incidence surface 31A in the third direction Y.

In other words, the backlight unit BL of the present embodiment is arranged such that the first lens 23 and the second lens 24 whose focal distances f1 and f2 are different from each other are arranged at positions where the focal points of the respective lenses match, that is, the straight lines D of the two lenses cross each other. The focal distance f1 of the first lens 23 is less than the focal distance f2 of the second lens 24, and the first lens 23 is arranged closer to the light source 21 than the second lens 24 is. The first lens 23 converts the light from the light source 21, and creates parallel light adjusted to be of substantially the same width (half width) as the length LZ of the incident surface 31A in the second direction Z. The second lens 24 converts the light from the light source 21, and creates parallel light adjusted to be of substantially the same width (half width) as the length LY of the incident surface 31A in the third direction Y.

Note that the sizes of the first and second lenses 23 and 24, and the focal distances f1 and f2 are not limited to the above examples, and may be selected suitably in accordance with the lengths LZ and LY of the incident surface 31A, and the angle of light emitted from the light source 21. That is, by suitably selecting the first and second lenses 23 and 24, the present embodiment can adapt to the incident surface 31A and the light source 21 of various specifications.

The backlight unit BL of the present embodiment structured as described above comprises the first lens 23 which controls the beam width of light in the second direction Z to the length LZ, and the second lens 24 which controls the beam width of light in the third direction Y to the length LY. Consequently, the light from the light source 21 which has passed through the first and second lenses 23 and 24 can be controlled to be parallel light.

Moreover, the first lens 23 which controls only the beam width of the light in the second direction Z, and the second lens 24 which controls only the beam width of the light in the third direction Y are independent of each other. Accordingly, even if the aspect ratio (the ratio between the long side and the short side) of the incident surface 31A is not the same as the aspect ratio (the ratio between the major axis and the minor axis) of light emitted from the light source 21, the beam width of the parallel light can be adjusted freely in accordance with the shape of the incident surface 31A. Since the backlight unit EL of the present embodiment can adapt to various types of light source 21 and incident surface 31A, and can make the aspect ratio of the parallel light the same as the aspect ratio of the incident surface 31A, power consumption can be reduced, and plane emission can be performed evenly.

The backlight unit BL includes only the first lens 23 as the lens which controls the beam width of light in the second direction Z. The light which has passed through the first lens 23 is controlled in a single step such that the beam width of light in the second direction Z corresponds to the length LZ in the second direction Z. When a conventional backlight unit is used, the beam width of parallel light in the second direction Z which has passed through the collimator becomes greater than the width of a light guide plate in the second direction Z. In this case, a collecting lens which converges the diffused light in the second direction Z again is required. Because an additional lens is provided, a loss of light and degradation of polarization property are inevitable. In the present embodiment, degradation which results from the lens can be kept to the minimum.

As shown in FIGS. 8 and 9, the incident surface 31A is formed such that the length LY in the third direction Y is greater than the length LZ in the second direction Z. The second lens 24 which controls the beam width of light in the third direction Y is arranged at a position more separated from the light source 21 than the first lens 23 is. Light which is more diffused in the third direction Y than the light which passes through the first lens 23 reaches the second lens 24. Accordingly, the beam width of light can be converted efficiently in accordance with the length LY of the incident surface 31A in the third direction Y.

In the present embodiment, since the light source 21 is a point light source which irradiates light whose beam width is smaller than the thickness (length LZ) of the light guide plate 30, it is possible to perform efficient control so that the beam width of parallel light which has passed through the collimator 22 does not exceed the length LZ of the incident surface 31A in the second direction Z.

Moreover, the light source 21 irradiates laser beams all having a wavelength of a narrow band. Since a refractive index of the lens depends on the wavelength of light, it is difficult to adjust highly collimated parallel light from light having a wavelength of a broad band. The backlight unit BL of the present embodiment can adjust highly collimated parallel light with a simple structure constituted of the first lens 23 and the second lens 24, since laser beams are used as the light of the light source 21. The display device DSP according to the present embodiment can improve the display quality of an image displayed on the display surface D1 by using such parallel light.

The light source unit LS according to the present embodiment emits highly collimated parallel light by the first and second lenses 23 and 24, and the light source 21. If a length of an optical path is increased due to multiple reflection, since there is a loss of light and reduction of a degree of polarization even within the light guide plate 30, the number of times the light is reflected should preferably be reduced. If the light emitted from the light source unit LS is parallel light, since an angle directed toward the light directing portion 40 can be easily controlled, it is possible to make the light enter the light directing portion 40 with the minimum number of times of reflection. Since an optical path length can be reduced, a loss of light within the light guide plate 30 can be reduced.

Apart from the above, various desirable advantages can be obtained from the present embodiment.

[Second Embodiment]

A second embodiment will be described referring to FIGS. 10 and 11. A backlight unit BL of the second embodiment further comprises a fourth lens 26 which widens light emitted from a light source 21 in the third direction Y. The fourth lens 26 as described above is, for example, a cylindrical lens which is recessed in planar view comprising a flat surface 26A and a concave surface (an inverted cylindrical surface) 26B. A GRIN lens, etc., having a similar function may be adopted.

As shown in FIGS. 10 and 11, a first lens 23, a second lens 24, and the fourth lens 26 are arranged in line along an optical axis of the light source 21. In the second embodiment and a modification of the second embodiment, the light source 21 is arranged at a position where light is focused when the parallel light is made incident on the second lens 24 and the fourth lens 26 in the first-B direction X2 of the first direction.

In the second embodiment shown in FIG. 10, the fourth lens 26 is disposed between the first lens 23 and the second lens 24. The fourth lens 26 is arranged in a direction in which an X-Z plane and the concave surface 26B intersect linearly and the cross-section becomes rectangular, and the concave surface 26B is opposed to the second lens 24. Note that the concave surface 26B may be opposed to the first lens 23. Likewise the fourth lens 26, the second lens 24 is arranged in a direction in which the X-Z plane and a convex surface 24B intersect linearly and the cross-section becomes rectangular. That is, the second and fourth lenses 24 and 26 are arranged such that axial directions thereof become the same. Light emitted from the light source 21 passes through the first lens 23, the fourth lens 26, and the second lens 24 in this order. The light which has passed through the second and fourth lenses 24 and 26 is adjusted so that the beam width of light in the third direction Y becomes the same as a length LY of an incident surface 31A in the third direction Y.

In the modification shown in FIG. 11, the fourth lens 26 is disposed between the light source 21 and the first lens 23. Light emitted from the light source 21 passes through the fourth lens 26, the first lens 23, and the second lens 24 in this order. Likewise the example illustrated in FIG. 10, the light which has passed through the second and fourth lenses 24 and 26 is adjusted so that the beam width of light in the third direction Y becomes the same as the length LY of the incident surface 31A in the third direction Y.

According to the backlight unit BL of the second embodiment and the modification thereof, since the beam width of the emission light from the light source 21 in the third direction Y is increased by the fourth lens 26, a distance between the light source 21 and the second lens 24 can be more reduced as compared to the backlight unit BL of the first embodiment. Thus, the backlight unit BL can be downsized, and the frame of the display device DSP can be narrowed.

[Third Embodiment]

A third embodiment will be described referring to FIGS. 12 and 13. In the third embodiment, a member different from an incident surface 31A of a light guide plate 30 has the function as a third lens 25, which refracts light from a light source 21 toward a light directing portion 40.

In the third embodiment shown in FIG. 12, a second lens 24 also serves as the third lens 25. In the example illustrated, a flat surface 24A at an entry side of light of the second lens 24 is inclined with respect to the first direction X and the second direction Z in the X-Z cross-section. Further, the flat surface 24A refracts the incident light toward the light directing portion 40. Although not illustrated, a convex surface 24B at an exit side of light may be inclined with respect to the first direction X and the second direction Z in the X-Z cross-section. Further, the convex surface 24B may refract light emitted from the convex surface 24B toward the light directing portion 40. Alternatively, the second lens 24 may be arranged in a direction in which the flat surface 24A is at the exit side, and the flat surface 24A may be similarly inclined as described above. The convex surface 24B which is set at the entry side may be similarly inclined as described above. In short, the second lens 24 according to the third embodiment is formed as an integral lens including the shapes of the second lens 24 and the third lens 25.

FIG. 13 is a cross-sectional view of a modification in which a first lens 23 is structured to also serve as the third lens 25. In the example of FIG. 13, the first lens 23 and the third lens 25 are formed as an integral lens including the shapes of the above two lenses. When it is assumed that the first lens 23 also serves as the third lens 25, the shape which exhibits the function as the third lens is not limited to a form which distinguishes itself from a form which exhibits the other function. That is, the embodiment covers a form which includes two or more functions even if the shapes according to the respective functions cannot be distinguished from each other because they are all merged. According to the third embodiment and a modification of the third embodiment, the degree of freedom in design can be improved because the function of the third lens 25 can be assigned to the other member instead of the incident surface 31A of the light guide plate.

[Fourth Embodiment]

A fourth embodiment will be described referring to FIG. 14. The fourth embodiment is structured such that an incident surface 31A of a light guide plate 30 also serves as a second lens 24. The incident surface 31A includes a convex surface (a cylindrical surface) 24B likewise the second lens 24, for example. That is, the incident surface 31A is formed into the convex surface (the cylindrical surface) which protrudes toward a first lens 23, and is inclined in a direction of being separated from a light source 21. More specifically, the incident surface 31A is formed such that a first main surface 32 is more separated from the light source 21 than a second main surface 33 is. A dimension corresponding to a length from the light source 21 to a light guide unit LG is determined by a length obtained by adding a distance between the second lens 24 and the light guide unit LG to a focal distance f2 of the second lens 24. According to the fourth embodiment, by minimizing the distance between the second lens 24 and the light guide plate 30, a backlight unit BL can be downsized. Further, by forming the second lens 24 and the light guide plate 30 as a single unit, the number of components can be reduced.

[Fifth Embodiment]

Figure 15:
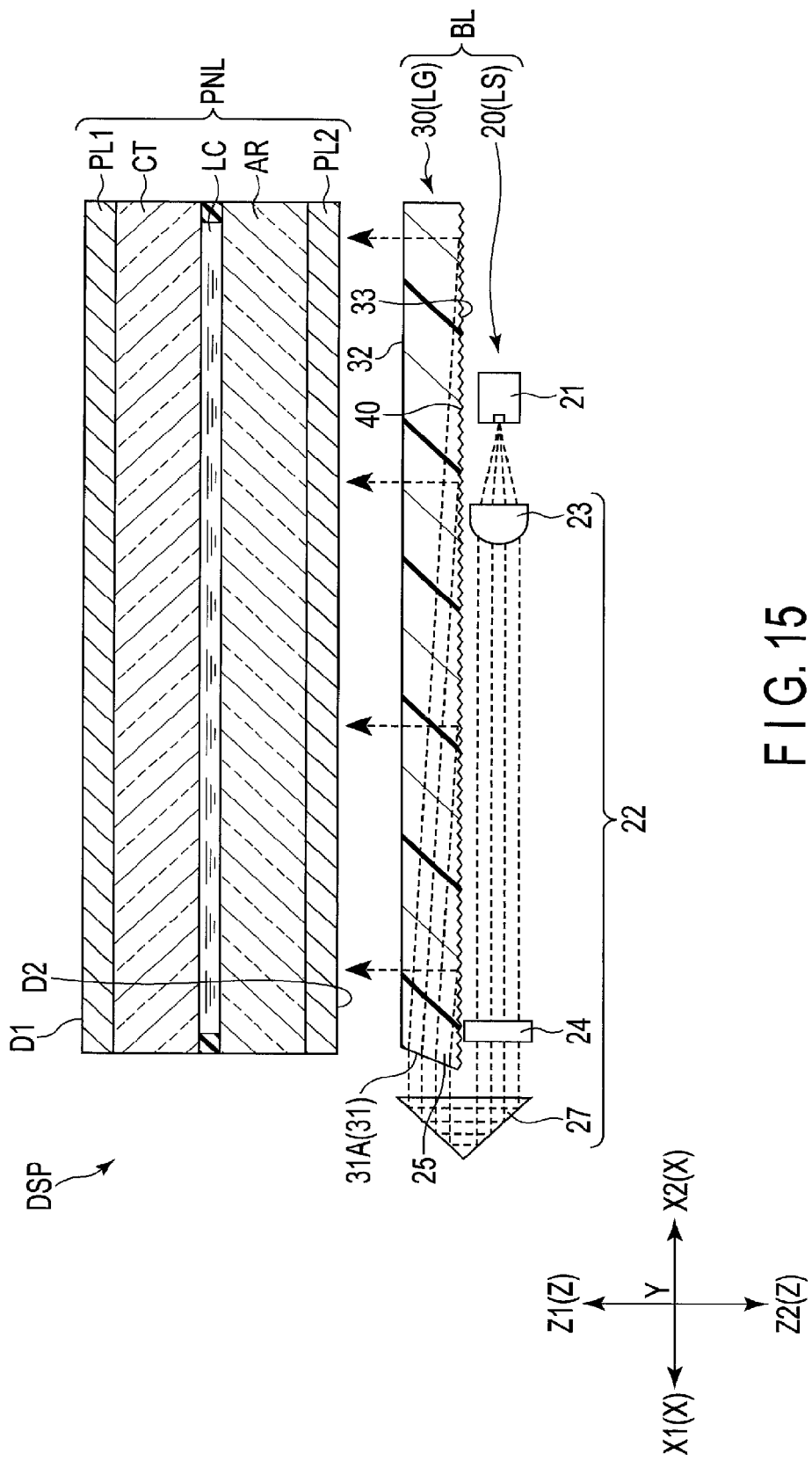
FIG. 15 is a cross-sectional view showing the structure of a backlight unit according to a fifth embodiment.

A fifth embodiment will be described referring to FIG. 15. A backlight unit BL of the fifth embodiment further comprises a bending portion 27 which bends and emits light, which is transmitted in the first-A direction X1 of the first direction, in the first-B direction X2 of the first direction opposite to the first-A direction X1. Note that the bending portion 27 may also serve as a third lens 25. In this case, the bending portion 27 may emit light that is irradiated in the first-A direction X1 in a direction substantially the same as the first-B direction X2.

The bending portion 27 is arranged to be opposed to an incident surface 31A. In the example illustrated in FIG. 15, a light source 21, a first lens 23, and a second lens 24 are arranged on the opposite side of the bending portion 27 with respect to the incident surface 31A, and face a second main surface 33 of a light guide plate 30. The second main surface 33 is the opposite side of a first main surface (an emission surface) 32 which irradiates planar light.

The bending portion 27 includes a first surface on which light traveling in the first-A direction X1 is incident, and second and third surfaces which bend the light entered from the first surface in the first-B direction X2. The first surface is formed perpendicular to the first-A direction X1, and is arranged along an optical axis of a light source 21.

The second surface is inclined in a direction of totally reflecting the light traveling in the first-A direction X1 toward the third surface. The third surface is inclined in a direction of totally reflecting light reflected by the second surface in the first-B direction X2.

The light emitted from the light source 21 enters a light guide unit LG via the bending portion 27. In the example illustrated in FIG. 15, the second lens 24 is arranged in the upstream side of an optical path of light with respect to the bending portion 27. Note that the second lens 24 may be arranged on the downstream side with respect to the bending portion 27.

In the fifth embodiment, the optical path of light can be turned back by the bending portion 27. Accordingly, while ensuring a focal distance f2 between the second lens 24 and the light source 21, a dimension of the backlight unit BL in the first direction X can be reduced. If the bending portion 27 is arranged, the first and second lenses 23 and 24 are not necessarily arranged in a frame region which is the outer side of the light guide plate 30. Thus, narrowing of the frame of the liquid crystal display device DSP can be achieved.

[Sixth Embodiment]

Figure 16:
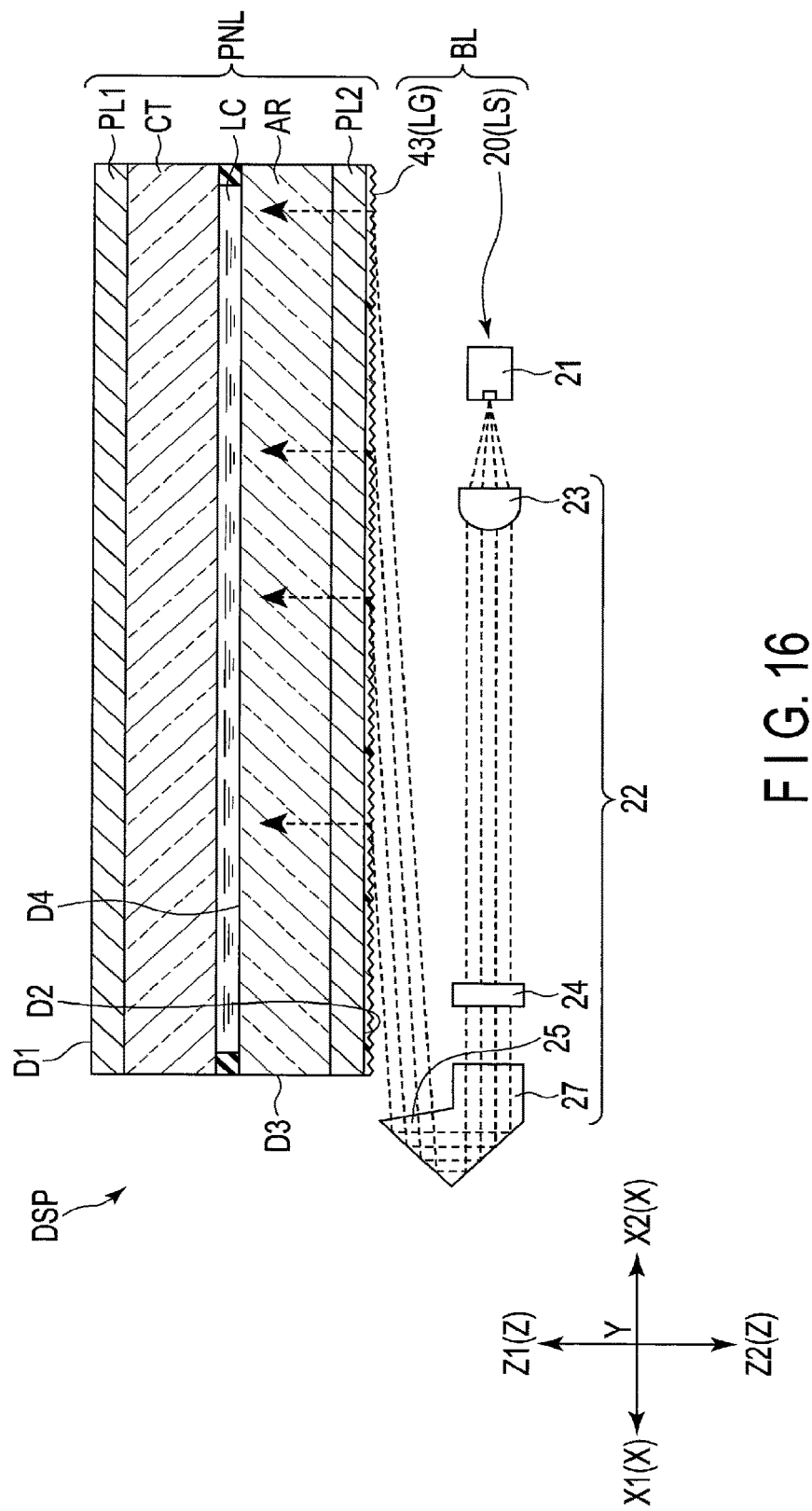
FIG. 16 is a cross-sectional view showing the structure of a backlight unit according to a sixth embodiment.

A sixth embodiment and a modification thereof will be described referring to FIGS. 16 and 17. FIG. 16 is a cross-sectional view showing the structure of a backlight unit BL of the sixth embodiment. The backlight unit BL of the sixth embodiment shown in FIG. 16 has a structure similar to that of the backlight unit BL of the fifth embodiment except for the point that a light guide plate 30 is not provided. The backlight unit BL of the sixth embodiment comprises a prism sheet 43. A bending portion 27 also serves as a third lens 25.

The prism sheet 43 includes an inner surface opposed to a rear surface D2 of a display panel PNL, and an outer surface on the opposite side of the inner surface. On either the inner surface or the outer surface, an inclined surface which totally reflects light likewise a light directing portion 40 to be provided in the light guide plate 30 is formed. The prism sheet 43 is an example of the light directing portion.

In the example illustrated in FIG. 16, the inner surface of the prism sheet 43 serves as an emission surface, and the outer surface serves as an incident surface. The aforementioned inclined surface is formed on the outer surface of the prism sheet 43. The inclined surface directs parallel light emitted from the bending portion 27 toward the inner surface of the prism sheet 43. The inner surface is adhered to the rear surface D2 of the display panel PNL. Parallel light emitted from a light source unit LS is made incident on the prism sheet 43 without involving the light guide plate 30.

Although not illustrated, as another example of the sixth embodiment, a side surface D3 of an array substrate AR may be formed as the incident surface, and a main surface D4 of the array substrate AR at the side close to a liquid crystal layer LC may be formed as an emission surface. In that case, the parallel light emitted from the bending portion 27 is made incident on the side surface D3 of the array substrate. After that, the parallel light is totally reflected by the prism sheet 43 adhered to the rear surface D2, and is emitted from the main surface D4. Alternatively, the inner surface of the prism sheet 43 may be structured as both the incident surface and the emission surface. In that case, a gap for passing through the parallel light should be formed between the prism sheet 43 and the rear surface D2 of the display panel PNL. The parallel light emitted from the bending portion 27 is made incident on the inner surface of the prism sheet 43 through the gap, is totally reflected by the inner surface, and is directed to the display panel PNL. In either of the above structures, the light guide plate 30 can be omitted.

According to the sixth embodiment, the backlight unit BL can be made small by omitting the light guide plate 30. As a result, a liquid crystal display device DSP can be downsized. Further, by suppressing reduction of a degree of polarization and reduction of the optical properties in the light guide plate 30, it is possible to improve the display quality of an image.

Figure 17:
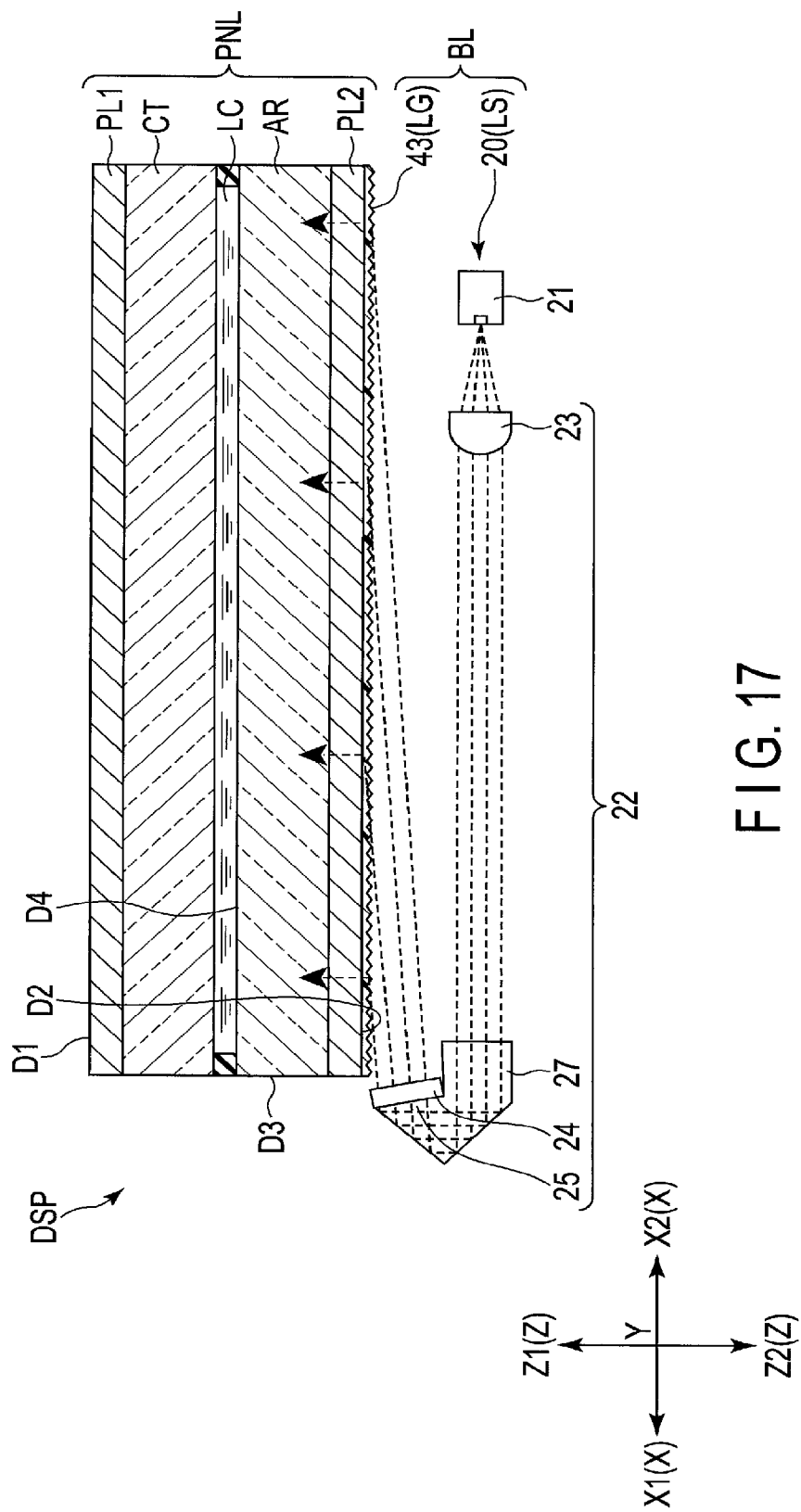
FIG. 17 is a cross-sectional view showing the structure of a modification of the backlight unit according to the sixth embodiment.

FIG. 17 is a modification of the sixth embodiment shown in FIG. 16. The second lens 24 according to the modification is arranged in the downstream side of an optical path of light as compared to the bending portion 27. In the example illustrated, the second lens 24 is arranged on a surface of the bending portion 27 from which the light is emitted. In this case, since the second lens 24 is arranged in the downstream side as compared to the bending portion 27, the light passes through the bending portion 27 after passing through the first lens 23, and then passes through the second lens 24. The second lens 24 is a lens which controls the beam width of light in the third direction Y. That is, by ensuring that a distance between a light source 21 and the second lens 24 is kept long, it is possible to increase the beam width of light in the third direction Y, and widely irradiate the light to correspond to the width of the light guide plate 30 in the third direction Y. As a result, the incident surface 31A shown in FIG. 9 can be designed to be wide in the length LY. Further, while a dimension corresponding to a length from the light source 21 to a light guide unit LG is one obtained by adding a distance between the second lens 24 and the light guide unit LG to a focal distance f2 of the second lens 24, in the modification, the backlight unit BL can be downsized by bringing the second lens 24 and the light guide unit LG (the prism sheet 43) close to each other. Note that in the modification, the bending portion 27 can be structured to also serve as the second lens 24.

In this case, the second lens 24 can be omitted and the structure can be simplified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in each of the embodiments, the backlight unit BL can be structured to irradiate polarized light oscillating in a direction parallel to an absorption axis of the polarizer PL1 on the display surface D1. If the polarized parallel light absorbed by the polarizer PL1 is to be created by the backlight unit BL, instead of the polarizer PL2 on the rear surface D2, the polarizer PL2 can be eliminated from the display device DSP. If two polarizers are provided, there is a loss of light every time the light passes through the polarizer. If the number of polarizers can be reduced to one from two, a loss of light caused by the polarizer can be reduced, and the power consumption can be reduced. As the number of polarizers is reduced, the liquid crystal display device DSP can be made thin.

When the backlight unit BL of each of the embodiments is structured as a backlight unit BL which irradiates polarized parallel light, the light guide plate 30 should preferably have low birefringence from the standpoint of maintaining the polarization direction of the polarized parallel light transmitted through the light guide plate 30. Further, as in the sixth embodiment, the light guide plate 30 can be omitted to suppress reduction of a degree of polarization in the light guide plate 30.

When the light guide plate 30 is provided, preferably, the light retardation in the light guide plate 30 should be, for example, less than or equal to a quarter of the dominant wavelength of parallel light incident on the light guide plate 30. The light guide plate 30 is formed of, for example, a mixture or a copolymer of a substance having positive birefringence and a substance having negative birefringence, and is formed of, for example, a polymer whose absolute value of intrinsic birefringence is less than or equal to $3 \times 10^{-3}$.

In the mixture, when a polymer having a positive intrinsic birefringence value and a polymer having a negative intrinsic birefringence value are mixed in an appropriate ratio, the birefringence of these polymers cancel each other and macroscopically disappear. Alternatively, in the mixture, as a low molecular weight substance having a rod-like molecular shape and polarizability anisotropy is added to a polymer, the birefringence of the polymer will be cancelled. In the copolymer, as a monomer having a positive intrinsic birefringence value and a monomer having a negative intrinsic birefringence value are copolymerized in an appropriate ratio, the polarizability anisotropy will be canceled within a single polymer chain. As the mixture or the copolymer, for example, a mixture or a copolymer described in JP 5263771B, paragraphs [0043] to [0052] can be applied.

What is claimed is:

1. A backlight comprising:
   a light source that emits light;
   a first lens and a second lens that are arranged in an optical path of the light, and convert the light into parallel light;
   a light guide on which the light transmitted through the first and second lenses is incident; and
   a bending portion that bends and emits the light transmitted from a first-A direction to a first-B direction opposite to the first-A direction, wherein
   the light is incident on the light guide via the bending portion,
   the light source emits the light that is diffused as the light travels in the first-A direction, the light being diffused in a second direction intersecting the first-A direction, and a third direction intersecting the first-A direction and the second direction, the first and second lenses control the light such that the first lens controls a beam width of the light in the second direction, and the second lens controls a beam width of the light in the third direction, thereby converting the light into parallel light, a length of the second lens in the third direction is greater than a length of the first lens in the third direction, the length of the first lens in the third direction is greater than a length of the first lens in the second direction, and the light passes through the first lens, the bending portion, and the second lens in this order.

2. The backlight of claim 1, further comprising a third lens, wherein the light guide includes an incident surface on which the light is incident, an emission surface from which the light is emitted, and a light directing portion that directs the light incident on the incident surface toward the emission surface, and the third lens refracts the light toward the light directing portion.

3. The backlight of claim 2, wherein the second lens also serves as the third lens.

4. The backlight of claim 1, further comprising a fourth lens that increases the beam width of the light in the third direction; and the light passes through the first lens, the fourth lens, and the second lens in this order.

5. The backlight of claim 1, wherein at least the first lens or the second lens is a Fresnel lens.

6. The backlight of claim 1, wherein:

the light guide includes a light guide plate; and the light guide plate is formed of a mixture or a copolymer of a substance having positive birefringence and a substance having negative birefringence, the substance having positive birefringence and the substance having negative birefringence canceling out the birefringence.

7. The backlight of claim 1, wherein the light guide does not include a light guide plate.

8. A display device comprising the backlight of claim 1, and a display panel that selectively transmits the light from the backlight.

9. The backlight of claim 2, further comprising a fourth lens that increases the beam width of the light in the third direction; and the light passes through the first lens, the fourth lens, and the second lens in this order.

* * * * *